(12) United States Patent
Hill et al.

(10) Patent No.: US 11,340,197 B2
(45) Date of Patent: May 24, 2022

(54) MECHANISMS AND METHODS FOR LIQUID SAMPLE INTRODUCTION INTO A CHROMATOGRAPHY SYSTEM

(71) Applicant: Waters Technologies Corporation, Milford, MA (US)

(72) Inventors: Jason Hill, Milford, MA (US); Abhijit Tarafder, Blackstone, MA (US); Joshua Burnett, Taunton, MA (US); Michael O. Fogwill, Uxbridge, MA (US)

(73) Assignee: Waters Technologies Corporation, Milford, MA (US)

( * ) Notice: Subject to any disclaimer, the term of this patent is extended or adjusted under 35 U.S.C. 154(b) by 382 days.

(21) Appl. No.: 16/678,762

(22) Filed: Nov. 8, 2019

(65) Prior Publication Data

US 2020/0150098 A1    May 14, 2020

Related U.S. Application Data

(60) Provisional application No. 62/757,909, filed on Nov. 9, 2018.

(51) Int. Cl.
*G01N 30/20* (2006.01)
*B01D 15/40* (2006.01)
(Continued)

(52) U.S. Cl.
CPC ............. *G01N 30/20* (2013.01); *B01D 15/14* (2013.01); *B01D 15/40* (2013.01);
(Continued)

(58) Field of Classification Search
CPC ........ B01D 15/14; B01D 15/40; G01N 30/20; G01N 2030/201; G01N 2030/202;
(Continued)

(56) References Cited

U.S. PATENT DOCUMENTS 6,576,125 B2    6/2003    Berger et al.
6,790,361 B2    9/2004    Wheat et al.
(Continued)

OTHER PUBLICATIONS

Miller at al. "Evaluation of injection conditions for preparative supercritical fluid chromatography." J. Chromatogr. A. 1250(2012): 256-263.

*Primary Examiner* — Justin N Olamit
(74) *Attorney, Agent, or Firm* — Womble Bond Dickinson (US) LLP; Deborah M. Vernon; Dennis J. Parad (57) ABSTRACT

The disclosure relates to a system for liquid sample introduction into a chromatography system. The system includes a metering device for drawing up the liquid sample, a first multi-port valve in fluid communication with a first end of the metering device and the liquid sample, a second multi-port valve in fluid communication with a second end of the metering device and a chromatography column, and a pump in fluid communication with the second multi-port valve and a mobile phase. When the valves are in a first position the metering device draws up the liquid sample filling a portion of the metering device. When the valves are in a second position, a remaining portion of the metering device is filled with the mobile phase thereby mixing with and pressurizing the liquid sample. When the valves are in a third position, the mixed and pressurized sample flows to the chromatography column.

12 Claims, 11 Drawing Sheets

(51) Int. Cl.
*B01D 15/14* (2006.01)
*G01N 35/10* (2006.01)
*G01N 30/02* (2006.01)

(52) U.S. Cl.
CPC ... *G01N 35/1097* (2013.01); *G01N 2030/027* (2013.01); *G01N 2030/201* (2013.01); *G01N 2030/202* (2013.01); *G01N 2030/207* (2013.01); *G01N 2035/1058* (2013.01)

(58) Field of Classification Search
CPC ......... G01N 2030/207; G01N 35/1097; G01N 2035/027; G01N 2035/1058
See application file for complete search history.

(56) References Cited

U.S. PATENT DOCUMENTS

| | | | |
|---|---|---|---|
| 8,794,052 B2 * | 8/2014 | Maeda | G01N 30/32 |
| | | | 73/61.55 |
| 10,690,639 B2 * | 6/2020 | Wachinger | G01N 30/24 |
| 10,816,515 B2 * | 10/2020 | Hollnagel | G01N 30/20 |
| 10,955,390 B2 * | 3/2021 | Minato | G01N 30/20 |
| 2006/0045810 A1 * | 3/2006 | Choikhet | G01N 30/20 |
| | | | 422/400 |

* cited by examiner

MECHANISMS AND METHODS FOR LIQUID SAMPLE INTRODUCTION INTO A CHROMATOGRAPHY SYSTEM

CROSS REFERENCE TO RELATED APPLICATIONS

This application claims priority to and benefit of U.S. provisional patent application No. 62/757,909 filed Nov. 9, 2018, the entire contents of which is incorporated herein by reference in its entirety.

FIELD OF THE TECHNOLOGY

The present disclosure relates to systems and methods for liquid sample introduction into a chromatography system. More specifically, the present disclosure relates to systems and methods for mixing a liquid sample with a highly compressible fluid (for example, carbon dioxide) to mix and pressurize the liquid sample prior to introduction into a chromatography system. In particular, the systems and methods of the present technology include either one or two valves configured to draw fluid into a metering device to achieve improved injection into a chromatography system.

BACKGROUND

Highly-compressible fluid chromatography is a type of chromatography that is configured to operate with a solvent that includes a fluid (e.g., carbon dioxide, Freon, etc.) that is in a gaseous state at ambient/room temperature and pressure. Typically, highly-compressible fluid chromatography involves a fluid that experiences noticeable density changes over small changes in pressure and temperature. Although highly compressible fluid chromatography can be carried out with several different compounds, in the current document, $CO_2$ will be used as the reference compound as it is the most commonly employed. (It is noted that highly-compressible fluid chromatography has also been referred to as $CO_2$-based chromatography, or in some instances as supercritical fluid chromatography (SFC), especially where $CO_2$ is used as the mobile phase.)

Introducing a liquid sample into a mobile phase can create a mismatch between the compositions of the sample and the composition of the mobile phase. Differences between the compositions of the sample and mobile phase can create significant loss of system performance. For example, in supercritical fluid chromatography (SFC), when a liquid sample is introduced into a mobile phase that includes a highly compressible fluid (e.g., carbon dioxide), it leads to severe peak distortion. This peak distortion is especially common for early eluting compounds in SFC and can lead to yield and/or productivity loss in preparative SFC.

Figure 1:
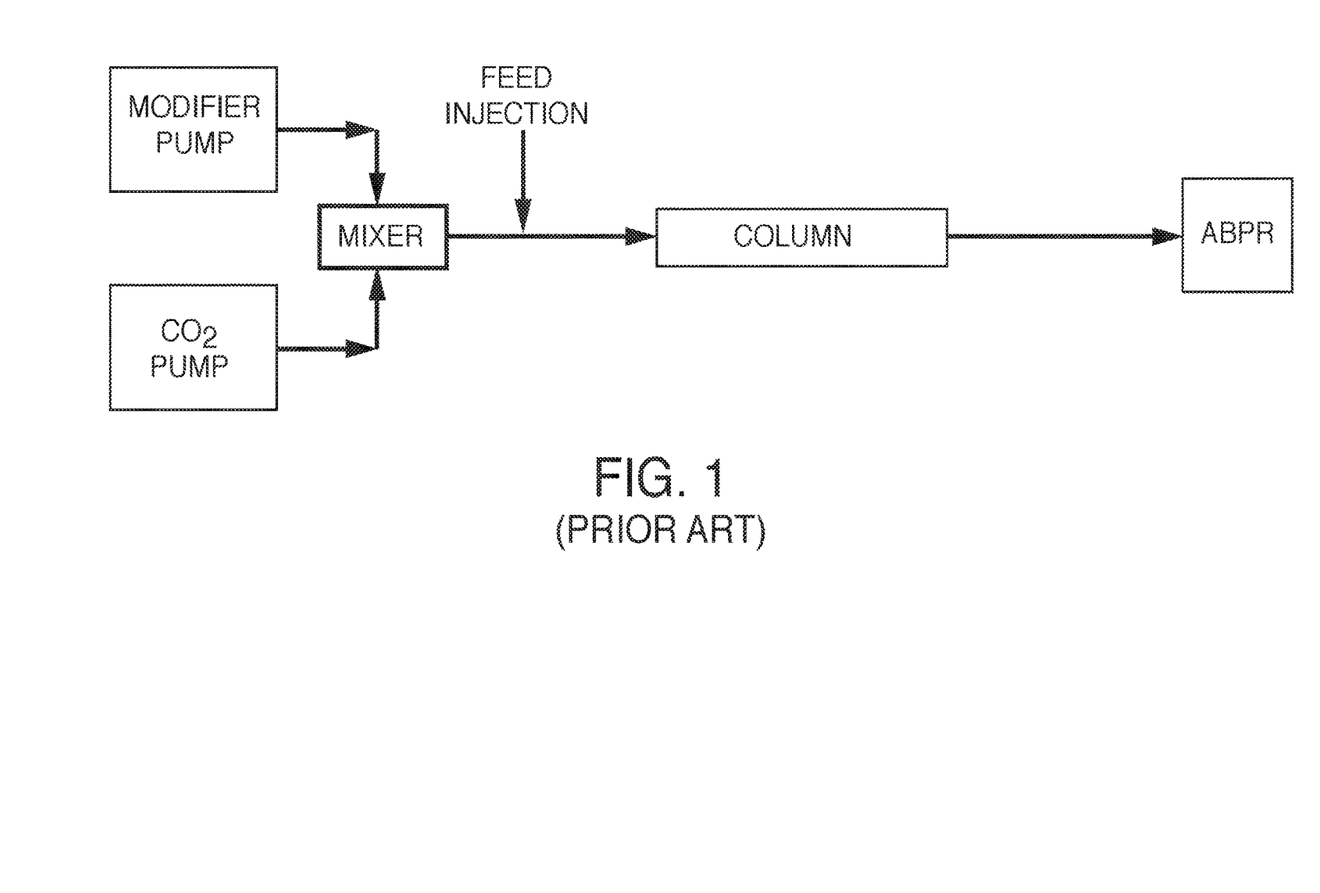
FIG. 1 is a block diagram showing a prior art mixed stream injection mechanism for chromatography.
Figure 2A:
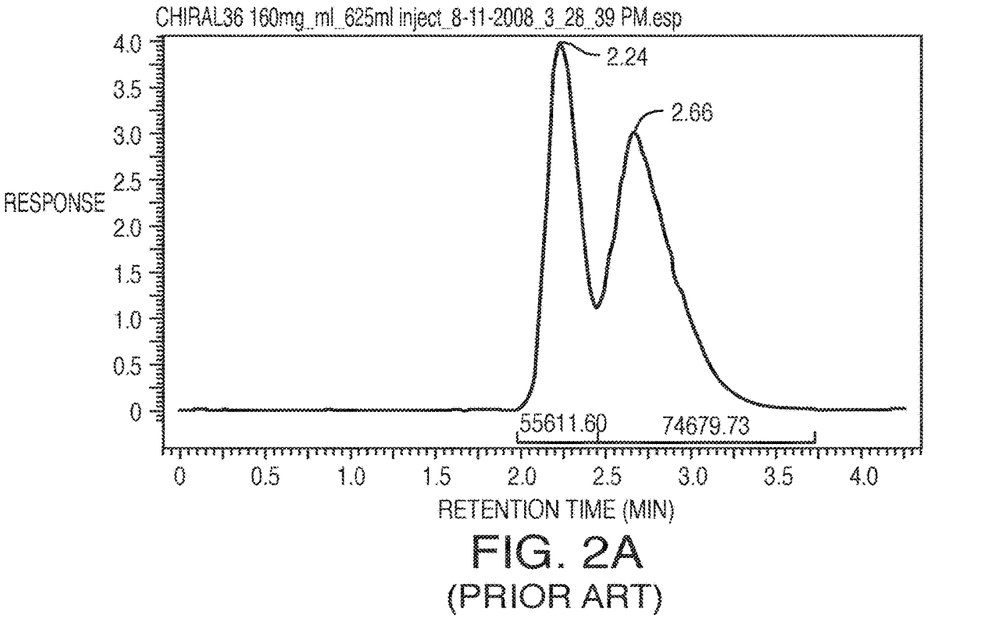
FIG. 2A is a chromatogram from a preparative separation using a mixed stream injection method of the prior art where the load was kept constant at 11 mg and the injection volume was 0.63 mL.
Figure 2B:
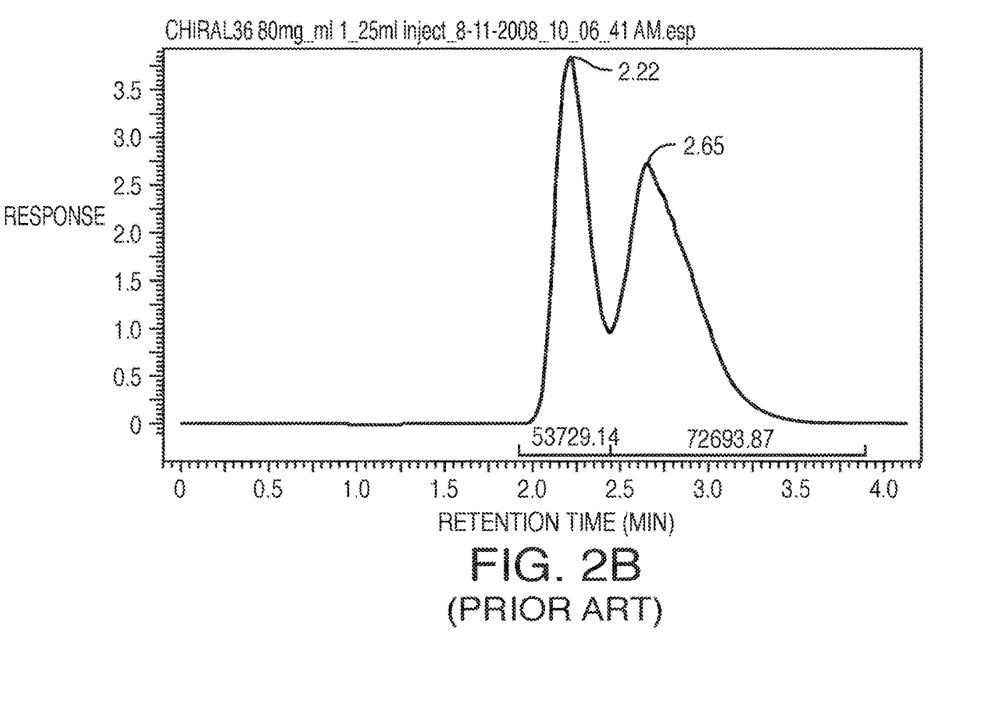
FIG. 2B is a chromatogram from a preparative separation using a mixed stream injection method of the prior art where the load was kept constant at 11 mg and the injection volume was 1.25 mL.
Figure 2C:
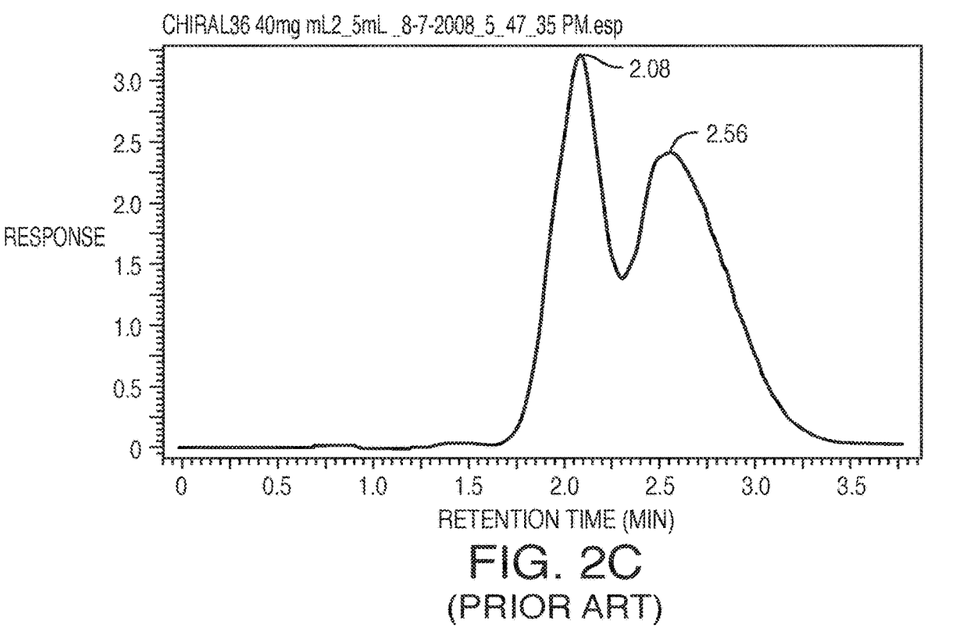
FIG. 2C is a chromatogram from a preparative separation using a mixed stream injection method of the prior art where the load was kept constant at 11 mg and the injection volume was 2.5 mL.
Figure 2D:
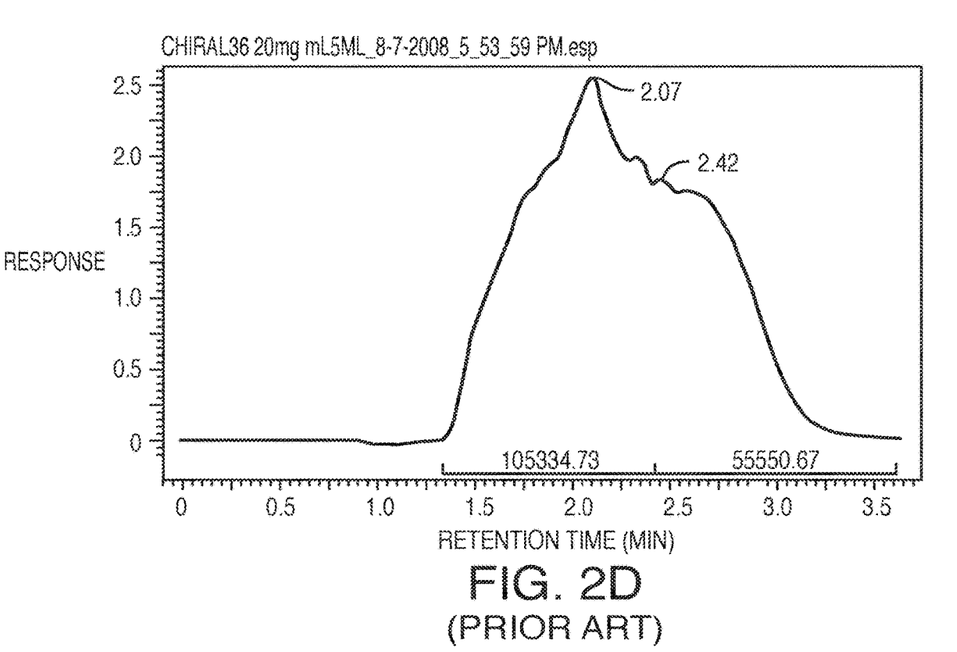
FIG. 2D is a chromatogram from a preparative separation using a mixed stream injection method of the prior art where the load was kept constant at 11 mg and the injection volume was 5 mL.

The most commonly used injection method in SFC (both analytical and preparative) is the so-called mixed-stream injection. This is the same mechanism that is typically used in liquid chromatography, for example, in high performance liquid chromatography (HPLC), where the sample (or feed) is injected directly into the mobile phase before the mobile phase flow to the column (see, FIG. 1). In HPLC often the sample is prepared in a solvent that matches the mobile phase composition to prevent peak distortion. However, in SFC, preparing the sample with a carbon dioxide based solvent is not directly possible, the solvent mismatch leads to significant problems with peak dispersion and/or distortion (see FIGS. 2A-D) As can be seen in FIGS. 2A-D, severe distortion of peaks can be observed with increasing injection volume.

SUMMARY

The present technology solves the problems of the prior art such that liquid sample can be drawn in, mixed with the SFC mobile phase (e.g., carbon dioxide) and then injected into a chromatography column.

The embodiments of the present disclosure provide advantages over the prior art by reducing the sample-solvent vs. mobile phase mismatch in an SFC system and hence (1) results in sharper peaks leading to increased resolution in an analytical system, and (2) allows injecting more sample in a preparative system leading to increased productivity.

The embodiments of the present technology relate to two and one valve systems and methods for liquid sample introduction into a chromatography system. The two and one valve configurations utilize a high pressure metering device to mix the liquid sample with a mobile phase (e.g., $CO_2$) prior to injecting the liquid sample into a chromatography column. In particular, the systems and methods of the present technology include either one or two valves configured to draw fluid into a metering device to achieve improved injection into a chromatography system. The two and one valve systems and methods provides a mechanism that results in sharper peaks leading to increased resolution and allows injecting more sample in a preparative system to increase productivity. In addition, the two and one valve configurations minimize the number of components used to achieve the advantages of pre-mixing the liquid sample and mobile phase (e.g., carbon dioxide) and results in overall lower system cost.

In one aspect, the technology relates to a system for liquid sample introduction into a chromatography system. The system includes a metering device for drawing up the liquid sample. The system also includes a first multi-port valve in fluid communication with a first end of the metering device and the liquid sample and a second multi-port valve in fluid communication with a second end of the metering device and a chromatography column. A pump is in fluid communication with the second multi-port valve and a mobile phase. When the valves are in a first position the metering device draws up the liquid sample filling a portion of the metering device. When the valves are in a second position, a remaining portion of the metering device is filled with the mobile phase thereby mixing with and pressurizing the liquid sample. When the valves are in a third position, the mixed and pressurized sample flows to the chromatography column. The system can have one or more of the embodiments described herein, or combinations thereof.

In some embodiments, the system also includes a tee in fluid communication with the first multi-port valve, the second multi-port valve, and the column.

The first multi-port valve and the second multi-port valve can be rotary valves, solenoid valves, or pneumatic valves. The first multi-port valve and the second multi-port valve can each have four ports, six ports, eight ports, or ten ports. In some embodiments, the first multi-port valve and the second multi-port valve each have the same number of ports. In some embodiments, the first multi-port valve and the second multi-port valve each have different numbers of ports.

The mobile phase can be a highly-compressible solvent. The highly-compressible solvent can be carbon dioxide. In some embodiments, the chromatography system is a supercritical fluid chromatography system.

In another aspect, the technology relates to a method for introducing liquid sample into a chromatography system. The method includes aspirating the liquid sample into a first end of a metering device through a first multi-port valve, wherein the liquid sample fills a portion of the metering device, flowing a mobile phase through a second multi-port valve into a chromatography column, adjusting the first valve such that a first portion the mobile phase flows into the chromatography column and a second portion of the mobile phase is aspirated into the first end of the metering device, thereby mixing and pressurizing the liquid sample and the mobile phase, and adjusting the second valve such that the mobile phase flows through the second valve and into a second end of the metering device thereby flowing the mixed mobile phase and the liquid sample into the chromatography column through the first valve. The method can include one or more of the embodiments described herein, or combinations thereof.

In some embodiments, the aspirating and flowing steps are performed simultaneously.

The mobile phase can be a highly-compressible solvent. The highly-compressible solvent can be carbon dioxide.

In another aspect, the technology relates to a system for liquid sample introduction into a chromatography system. The system includes a metering device for drawing up the liquid sample and a multi-port valve in fluid communication with a first end of the metering device, a second end of the metering device, and a chromatography column. A pump is in fluid communication with multi-port valve and a mobile phase. When the multi-port valve is in a first position the metering device draws up the liquid sample filling a portion of the metering device. When the multi-port valve is in a second position, a remaining portion of the metering device is filled with the mobile phase thereby mixing with and pressurizing the liquid sample. When the multiport valve is in a third position, the mixed and pressurized sample flows to the chromatography column. The system can have one or more of the embodiments described herein, or combinations thereof.

In some embodiments, the multi-port valve can be a rotary valve, a solenoid valve, or a pneumatic valve. The multi-port valve can have four ports, six ports, eight ports, or ten ports.

The mobile phase can be a highly-compressible solvent. The highly-compressible solvent can be carbon dioxide. The chromatography system can be a supercritical fluid chromatography system.

In another aspect, the technology relates to a method for introducing liquid sample into a chromatography system. The method includes aspirating the liquid sample into a first end of a metering device through a multi-port valve in a first position, wherein the liquid sample fills a portion of the metering device, flowing a mobile phase through the multi-port valve in the first position into a chromatography column, adjusting the multiport valve to a second position such that a first portion the mobile phase flows into the chromatography column and a second portion of the mobile phase is aspirated into the first end of the metering device, thereby mixing and pressurizing the liquid sample and the mobile phase, and adjusting the multi-port valve to a third position such that the mobile phase flows through the multi-port valve and into a second end of the metering device thereby flowing the mixed mobile phase and the liquid sample into the chromatography column through the multi-port valve. The method can have one or more of the embodiments described herein, or combinations thereof.

In some embodiments, the aspirating and flowing steps are performed simultaneously.

The mobile phase can be a highly-compressible solvent. The highly-compressible solvent can be carbon dioxide.

In another aspect, the technology relates to a system for liquid sample introduction into a chromatography system. The system includes a metering device for drawing up the liquid sample and a multi-port valve in fluid communication with the metering device and the liquid sample. When the multi-port valve is in a first position the metering device draws up the liquid sample filling a portion of the metering device When the multi-port valve is in a second position, a remaining portion of the metering device is filled with a mobile phase thereby mixing with and pressurizing the liquid sample and the mixed and pressurized sample flows to the chromatography system. The system can have one or more of the embodiments described herein, or combinations thereof.

In yet another aspect, the technology relates to a method for introducing a liquid sample into chromatography system. The method includes aspirating the liquid sample into a metering device through a multi-port valve, wherein the sample fills a portion of the metering device, flowing a mobile phase through the multi-port valve into a chromatography column, adjusting the multiport valve such that a first portion the mobile phase flows into the chromatography column and a second portion of the mobile phase is aspirated into the metering device, thereby mixing and pressurizing the liquid sample and the mobile phase, and dispensing the mixed mobile phase and the liquid sample into the chromatography column through the multi-port valve. The method can have one or more of the embodiments described herein, or combinations thereof.

BRIEF DESCRIPTION OF THE DRAWINGS

The technology will be more fully understood from the following detailed description taken in conjunction with the accompanying drawings, in which.

DETAILED DESCRIPTION

The technology relates to two and one valve systems and methods for introducing a sample into a mobile phase, particularly with respect to the introduction of a liquid sample into a carbon dioxide mobile phase in a chromatography system. The technology reduces the sample-solvent vs. mobile phase mismatch in an SFC system and hence (1) results in sharper peaks leading to increased resolution in an analytical system, and (2) allows injecting more sample in a preparative system leading to increased productivity. The two and one valve configurations also reduce the number of valves that are used in the system and therefore reduce system cost.

The method generally includes partially filling a metering device with a sample, substantially filling a remaining portion of the metering device with a mobile phase to form a mixed sample and mobile phase, and introducing the mixed sample and mobile phase into the chromatography system. The volume of sample that can be injected with this technology includes volumes less than about 1 µL to volumes greater than 20 mL. The mobile phase can be a highly compressible solvent, for example carbon dioxide. The metering device can be a high pressure metering device, a high pressure metering syringe, or a high pressure pump (for example, for use with pressures up to about 600 bar), each of which are capable of metering fluids at variable speeds and with high accuracy. The metering device can have a volume of about 10 µL to about 50 mL, depending on the scale (e.g., analytical, preparative) of the chromatography. The apparatus works with a switching valve, a valve that can be moved into varying positions to alter the flow of the sample and/or the mobile phase. The chromatography system can be a super critical fluid chromatography system. This general method can be implemented several ways using a variety of different valve configurations, which are exemplified below. One of ordinary skill in the art will understand that there are other valve and system configurations that can be used to implement the method described above.

The technology can provide a system that works with two valves. FIGS. 3A-3F show a two-valve system 300 for introducing a liquid sample into a chromatography system. The two valve system 300 uses a valve scheme and a high pressure metering device, for example, a high pressure metering syringe or a high pressure pump capable of metering fluids at variable speeds and with high accuracy. The high pressure metering device has a connection at the head of the device and also a connection at the back side of the device. The apparatus is configured in such a way so that liquid sample can be drawn in and mixed with the mobile phase, for example, carbon dioxide. Once the sample is mixed with the mobile phase in the high pressure metering device, an injection is triggered by diverting mobile phase into the back side of the high pressure metering device to sweep the volume of the device and into the chromatography column, for example, an SFC column. A step-by-step operational procedures is shown in FIGS. 3A-3F.

Figure 3A:
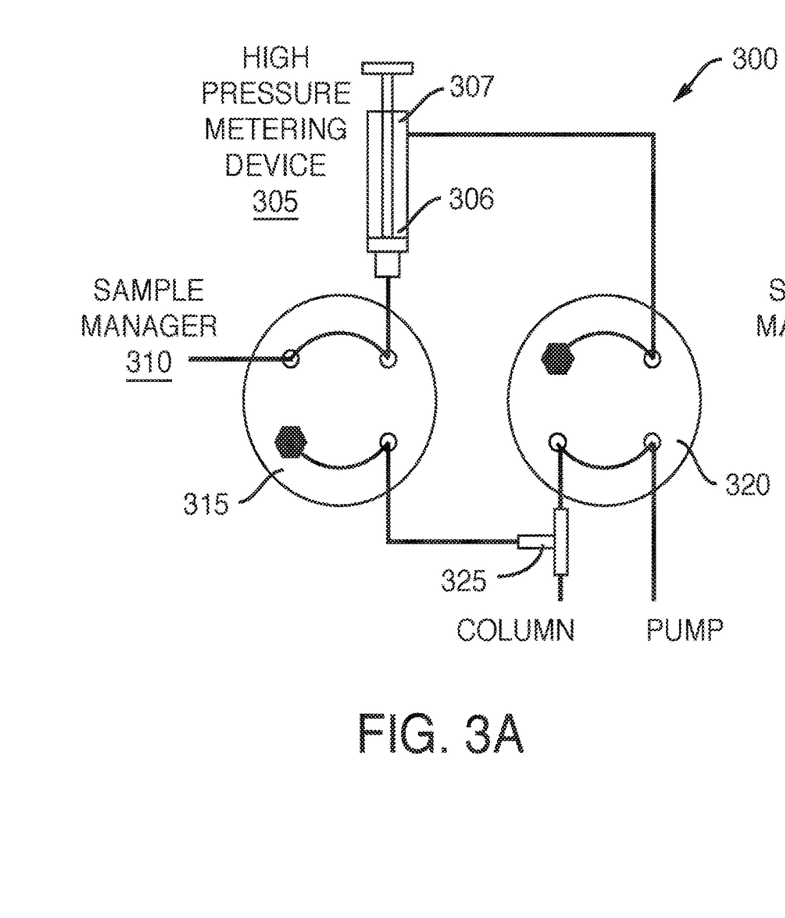
FIG. 3A is a schematic diagram showing a two-valve system for liquid sample introduction into a chromatography system with the valves in a first position, according to an illustrative embodiment of the technology.

Referring to FIG. 3A, the system 300 includes a metering device 305, for example a high pressure metering device, for drawing up sample. The sample can be drawn up from a sample manager 310. A first multi-port valve 315 is in fluid communication with a first end 306 of the metering device 305 and the liquid sample. A second multi-port valve 320 is in fluid communication with a second end 307 of the metering device 305 and a chromatography column. A pump is in fluid communication with the second valve 320 and a mobile phase, for example a highly compressible solvent, which can be carbon dioxide. In some embodiments, the system 300 also includes a tee 325 in fluid communication with the first valve 315, the second valve 320 and the chromatography column. Fluid communication allows two members to communicate with each other via passageways or channels to provide a means of fluid flow between two or more vessels or members. The fluid communication can be between two liquids, two gases or a combination of liquids and gases.

Figure 3B:
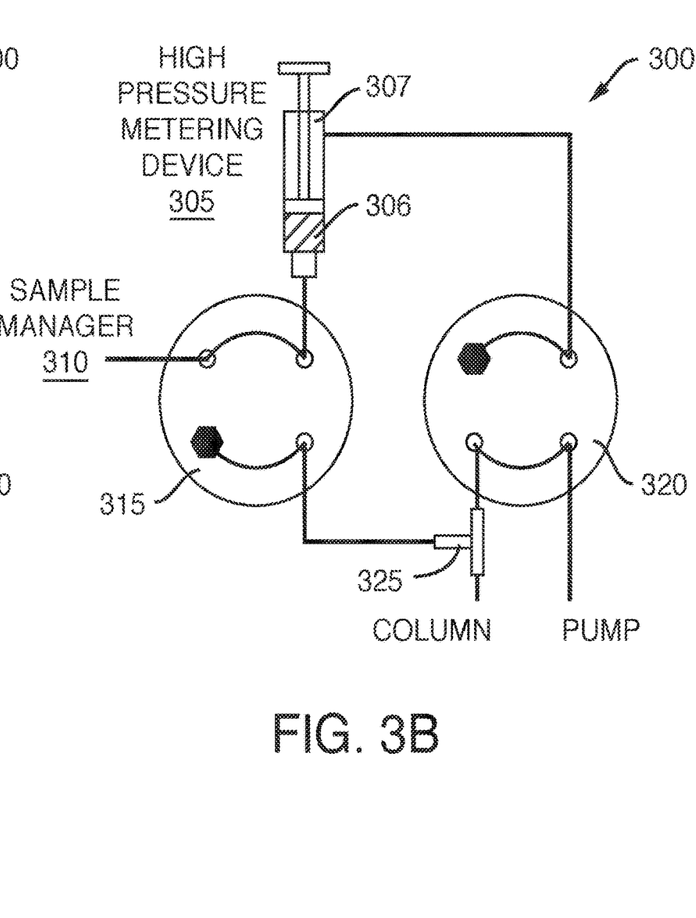
FIG. 3B is a schematic diagram showing a two-valve system for liquid sample introduction into a chromatography system with the valves in a first position, according to an illustrative embodiment of the technology.
Figure 3C:
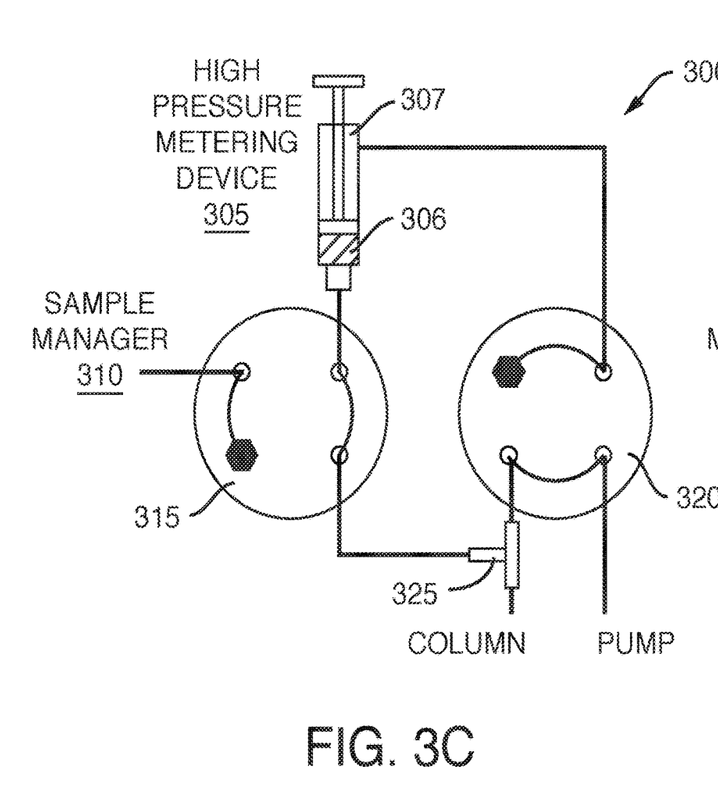
FIG. 3C is a schematic diagram showing a two-valve system for liquid sample introduction into a chromatography system with the valves in a second position, according to an illustrative embodiment of the technology.
Figure 3D:
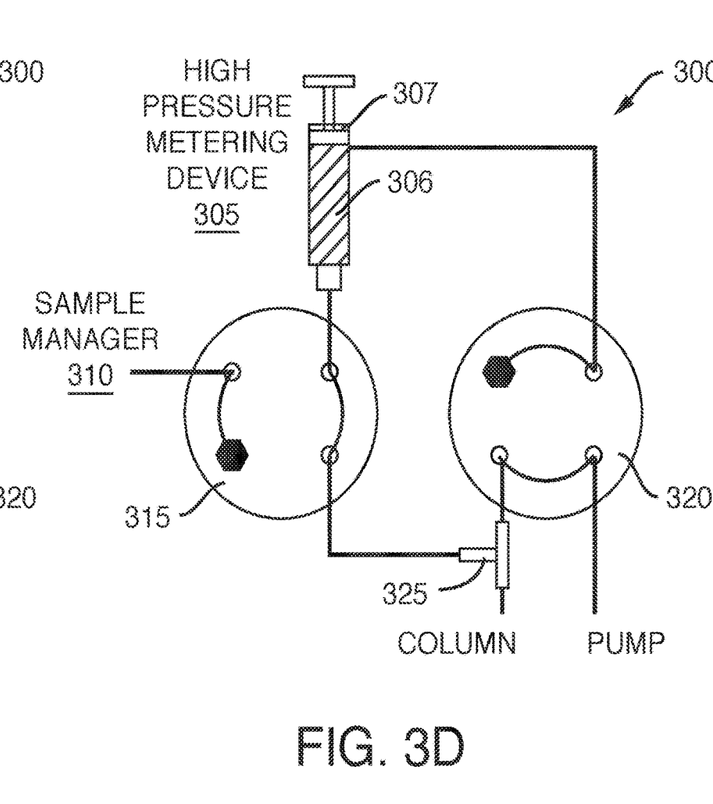
FIG. 3D is a schematic diagram showing a two-valve system for liquid sample introduction into a chromatography system with the valves in a second position, according to an illustrative embodiment of the technology.
Figure 3E:
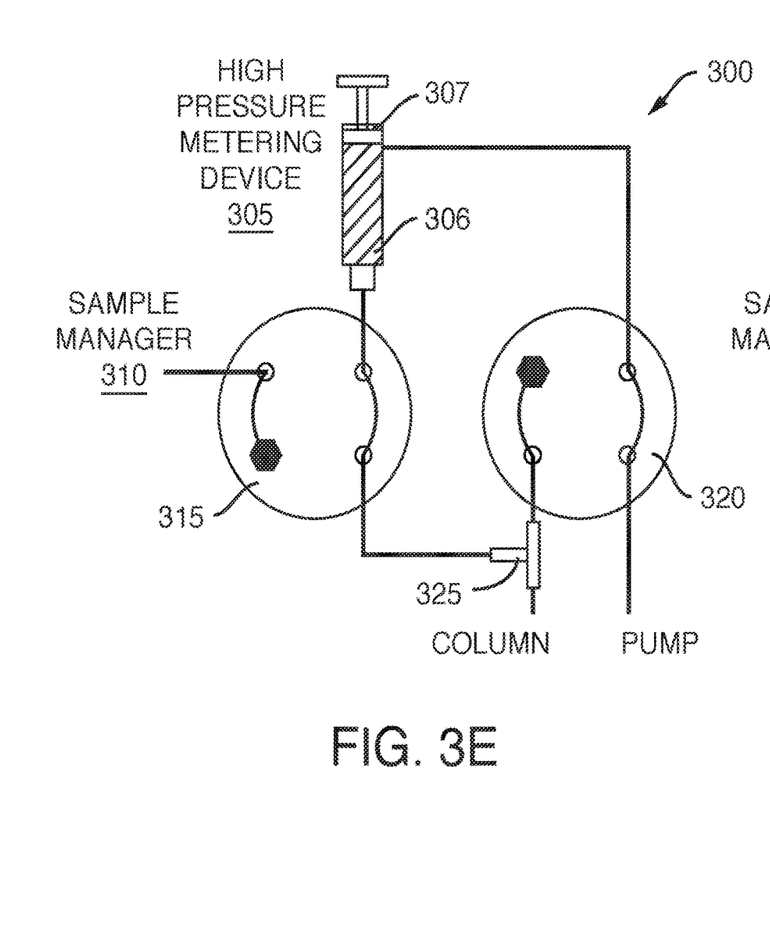
FIG. 3E is a schematic diagram showing a two-valve system for liquid sample introduction into a chromatography system with the valves in a third position, according to an illustrative embodiment of the technology.

Referring to FIGS. 3A and 3B, when the valves 315, 320 are in a first position, the metering device 305 draws up the liquid sample filling a portion of the metering device 305. Referring to FIGS. 3C and 3D, when the valves 315, 320 are in a second position, a remaining portion of the metering device 305 is filled with mobile phase (e.g., carbon dioxide), thereby mixing with and pressurizing the liquid sample. Referring to FIG. 3E, when the valves 315, 320 are in a third position, the mixed an pressurized sample flows to the chromatography column.

The first valve 315 and the second valve 320 can each have six, eight, or ten ports. In some embodiments, the valves have less than six ports, for example four ports, or more than ten ports, for example twelve ports. In some embodiments the valves 315, 320 each have the same number of ports and in other embodiments the valves have different numbers of ports. The valves 315, 320 can be rotary valves, solenoid valves, or pneumatic valves. In some embodiments, the valves 315, 320 are all rotary valves. In other embodiments, the valves 315, 320 are all solenoid valves. In other embodiments, the valves 315, 320 are all pneumatic valves. The valves 315, 320 can be different valves, for example, valve 315 can be a rotary valve and valves 320 can be a solenoid valve, or vice versa.

A two-valve method for introducing a liquid sample into a chromatography system, for example the system of FIGS. 3A-3F is also provided. Referring to FIG. 3A, the system 300 is in an initial state. The mobile phase flows from a pump in and out of a second valve 320 and into a chromatography column.

Referring to FIG. 3B, the method includes aspirating a liquid sample from a sample manager 310 into a first end 306 of a metering device 305 through a first multi-port valve 315. The liquid sample fills a portion of the metering device 305. The volume of the sample pulled into the metering device 305 is some portion less than the total volume of the metering device 305, for example the sample can fill 25% of the metering device 305 or 50% of the metering device 305 or 75% of the metering device. A mobile phase (e.g., a highly compressible solvent, which can be carbon dioxide) is flowed through a second multi-port valve 320 into a chromatography column, for example a SFC column. These two steps can be performed simultaneously.

Referring to FIGS. 3C and 3D, the first valve 315 is adjusted such that a first portion of the mobile phase flows into the chromatography column and a second portion of the mobile phase is aspirated into the first end 306 of the metering device 305, thereby mixing and pressurizing the liquid sample and the mobile phase. This can be accomplished through a tee 325, which connects the first valve 315, the second valve 320 and the chromatography column. In some embodiments a majority (e.g., greater than 50%) of the mobile phase flows to the chromatography column.

Referring to FIG. 3E, the second valve 320 is adjusted such that the mobile phase flows through the second valve 320 and into a second end 307 of the metering device 305 thereby flowing the mixed mobile phase and the liquid sample into the chromatography column through the first valve 315.

Figure 3F:
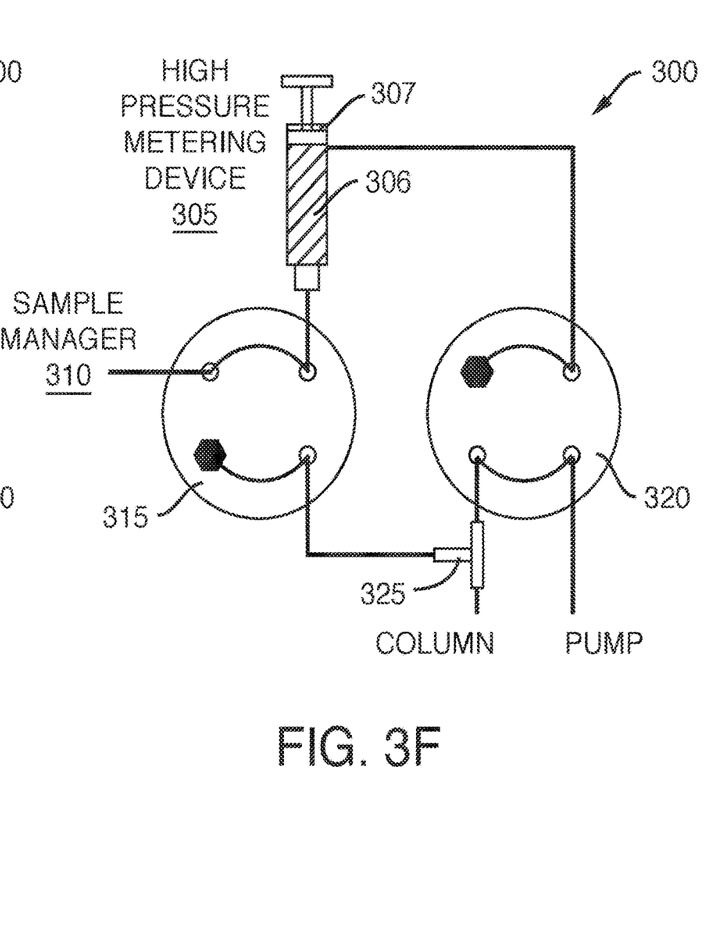
FIG. 3F is a schematic diagram showing a two-valve system for liquid sample introduction into a chromatography system with the valves in the first position, according to an illustrative embodiment of the technology.

Referring to FIG. 3F, the valves 315, 320 are adjusted so the mobile phase flows from the pump in and out of the second valve 320 and into the chromatography column. The contents of the metering device 305 is open to the sample manager 310 and therefore a depressurization of the metering device 305 is managed by the sample manager 310. Once the metering device 305 is depressurized, the metering device 305 fully depresses as shown in FIG. 3A. The metering device 305 can now be cleaned with rinse solvents managed by the sample manager 310.

Figure 4A:
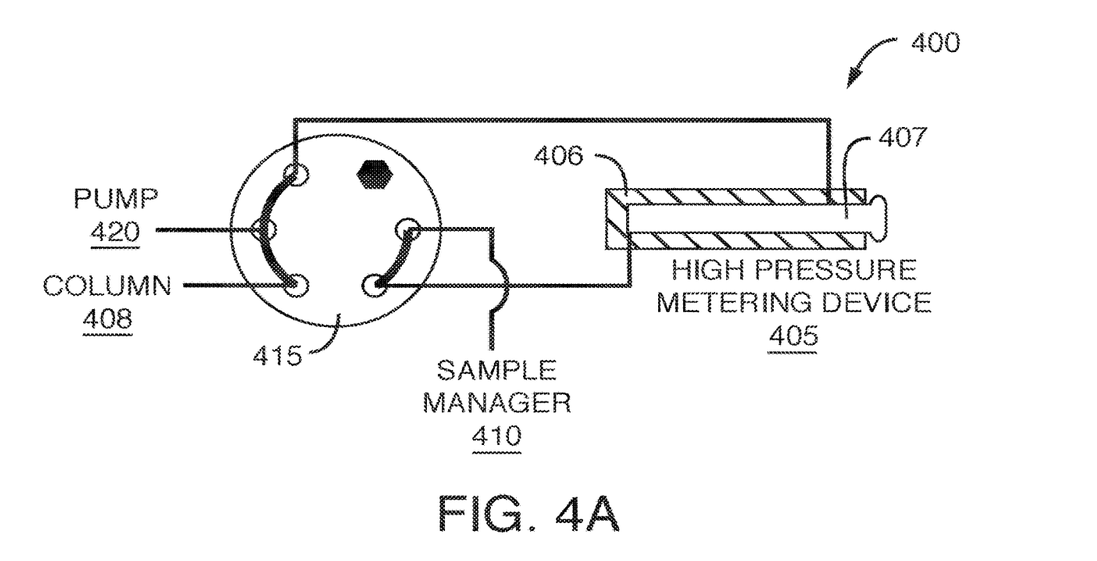
FIG. 4A is a schematic diagram showing a one-valve system for liquid sample introduction into a chromatography system with the valve in a first position, according to an illustrative embodiment of the technology.

The technology can provide a system that works with a single valve. FIGS. 4A-4F show a one-valve system 400 for introducing a liquid sample into a chromatography system. Referring to FIG. 4A, the system includes a metering device 405 for drawing up liquid sample from a sample manager 410. A multi-port valve 415 is in fluid communication with a first end 406 of the metering device 405, a second end 407 of the metering device 405 and a chromatography column 408. A pump 420 is in fluid communication with the valve 415 and a mobile phase.

Figure 4B:
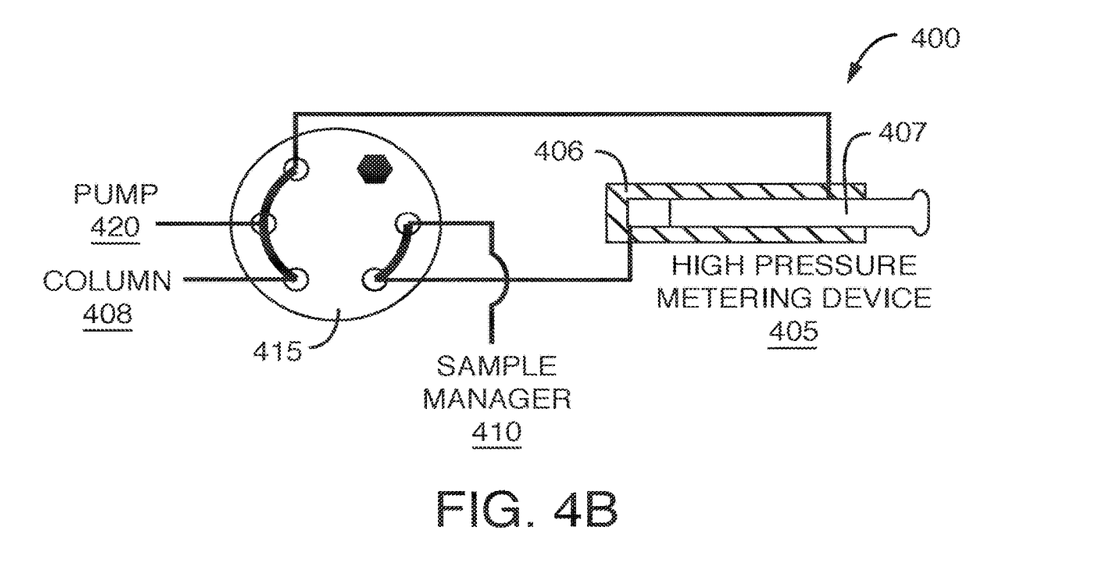
FIG. 4B is a schematic diagram showing a one-valve system for liquid sample introduction into a chromatography system with the valve in a first position, according to an illustrative embodiment of the technology.
Figure 4C:
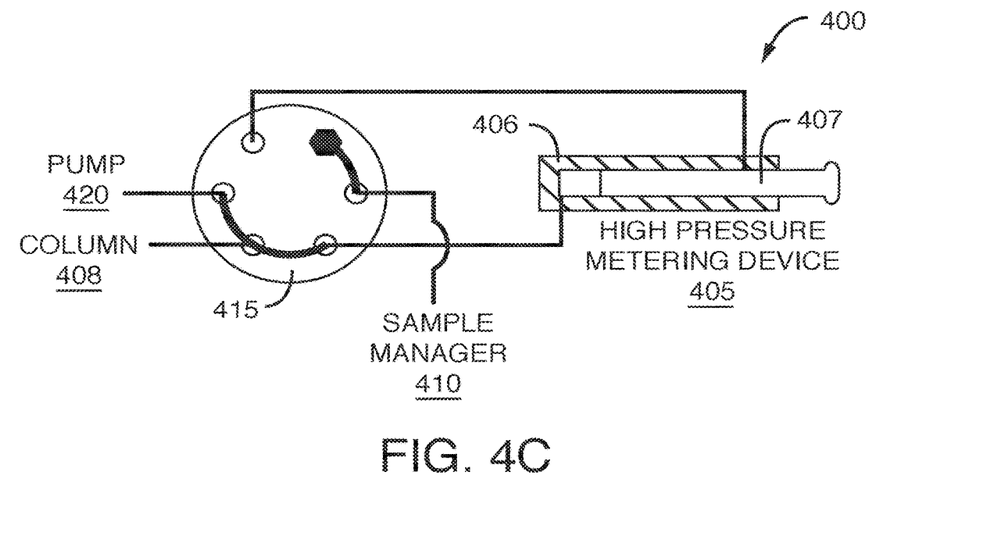
FIG. 4C is a schematic diagram showing a one-valve system for liquid sample introduction into a chromatography system with the valve in a second position, according to an illustrative embodiment of the technology.
Figure 4D:
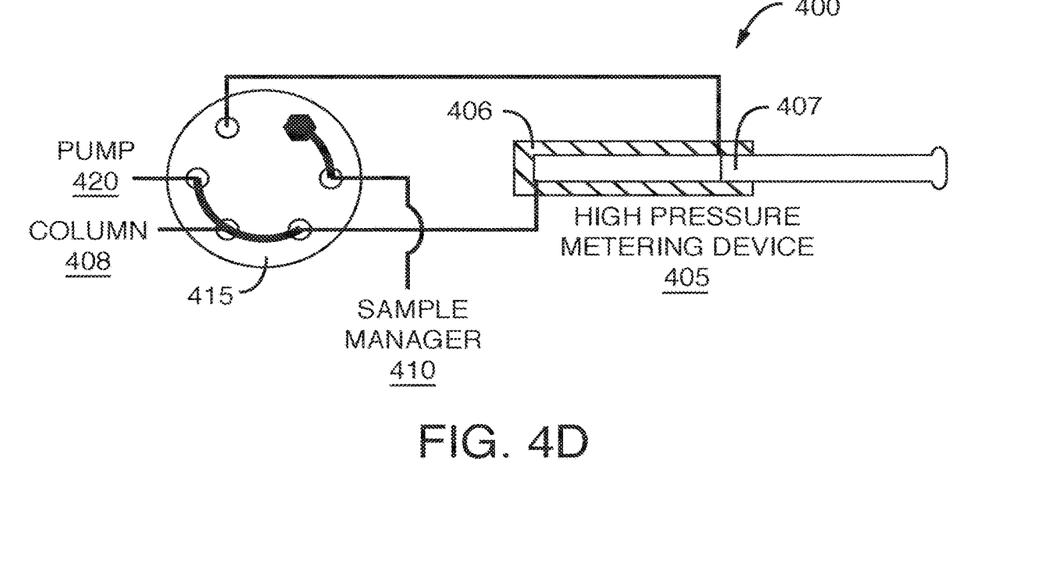
FIG. 4D is a schematic diagram showing a one-valve system for liquid sample introduction into a chromatography system with the valve in a second position, according to an illustrative embodiment of the technology.
Figure 4E:
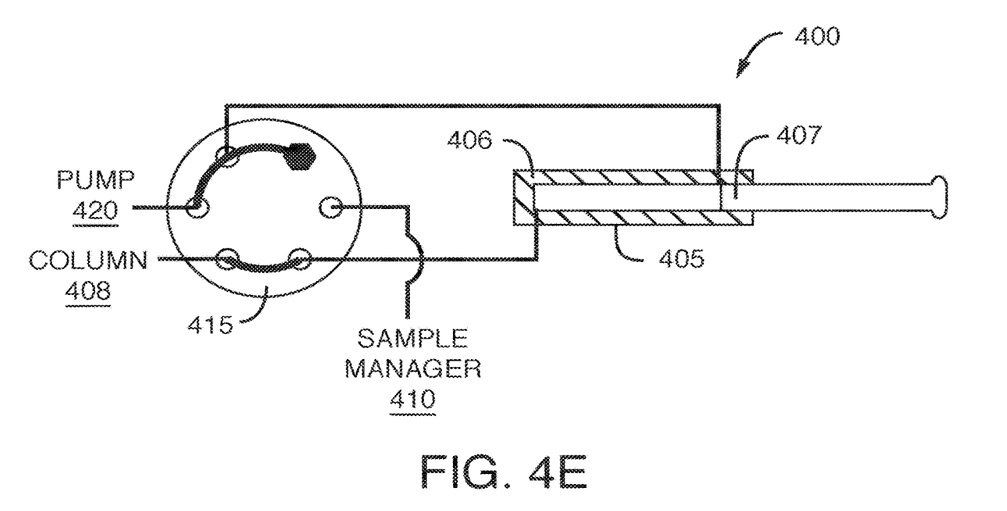
FIG. 4E is a schematic diagram showing a one-valve system for liquid sample introduction into a chromatography system with the valve in a third position, according to an illustrative embodiment of the technology.

Referring to FIGS. 4A and 4B, when the valve 415 is in a first position, the metering device 405 draws up liquid sample from the sample manager 410 filing a portion of the metering device 405. Referring to FIGS. 4C and 4D, when the valve 415 is in a second position, the remaining portion of the metering device 405 is filled with the mobile phase (e.g., a highly compressible solvent, which can be carbon dioxide), thereby mixing with and pressurizing the liquid sample. Referring to FIG. 4E, when the valve 415 is in a third position, the mixed and pressurized sample flows to the chromatography column 408.

The valve 415 can have six, eight, or ten ports. In some embodiments, the valve has less than six ports, for example four ports, or more than ten ports, for example twelve ports. The valve 415 can be a rotary valves or a solenoid valve.

The mobile phase can be a highly compressible solvent, for example, carbon dioxide. The chromatography system can be a supercritical chromatography system.

A one-valve method for introducing a liquid sample into a chromatography system, for example the system of FIGS. 4A-4F, is also provided. Referring to FIG. 4A, the system 400 is in an initial state. The mobile phase travel from the pump 420, in and out of the valve 415, and onto the chromatography column 408. The mobile phase is also fluidly connected to the second end 407 of a high pressure metering device 405. This requires a high pressure seal between the connection and the plunger to prevent leakage out the back end of the metering device 405. This can also be solved with a high pressure on/off valve between the valve 415 and the metering device 405.

Referring to FIG. 4B, the method includes aspirating the liquid sample, for example, from the sample manager 410, into a first end 406 of a metering device 405 through a multi-port valve 415 in a first position. The liquid sample fills a portion of the metering device 405. The volume of sample pulled into the metering device 405 is some portion less than the total volume of the metering device 405. The mobile phase flows from pump 420 through the multiport valve 415 in the first position into a chromatography column 408. These two steps can be performed simultaneously.

Referring to FIG. 4C, the valve 415 is adjusted to a second position. The mobile phase travels from the pump 420 in and out of the valve 415 and onto the column 408. The mobile phase is also fluidly connected to the first end 406 of the metering device 405.

Referring to FIG. 4D, the valve 415 is in the second position such that a first portion of the mobile phase flows into the chromatography column 408 and a second portion of the mobile phase is aspirated into the first end 406 of the metering device 405, thereby mixing and pressurizing the liquid sample and the mobile phase. The majority (e.g, greater than 50%) of the mobile phase travels from the pump 420, in and out of the valve 415, and onto the column 408. If there is an on/off valve between the valve 415 and the second end 407 of the metering device 405, it is actuated in this step to allow the connection.

Referring to FIG. 4E, the valve 415 is adjusted to a third position such that the mobile phase flows through the valve 415 and into a second end 407 of the metering device 405 thereby flowing the mixed mobile phase and the liquid sample into the chromatography column 408 through the multi-port valve 415.

Figure 4F:
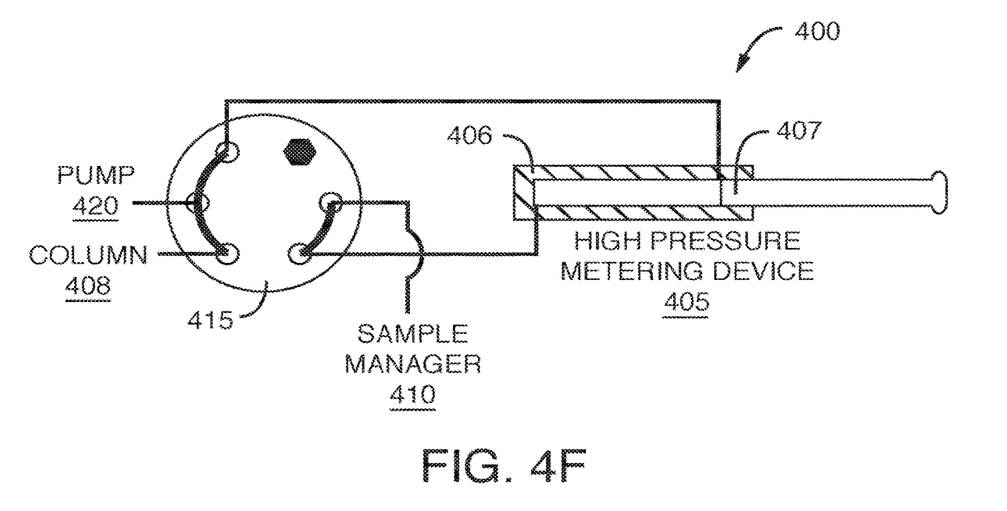
FIG. 4F is a schematic diagram showing a one-valve system for liquid sample introduction into a chromatography system with the valve in the first position, according to an illustrative embodiment of the technology.

Referring to FIG. 4F, the valve actuates back to the first position. The mobile phase flows from the pump 420 in and out of the valve 415 and onto the column 408. The high pressure metering device 405 depresses partially to block the fluidic connection between the valve 415 and the second end 407 of the metering device 405. Alternatively, the valve 415 does not depress and the connection is blocked with an on/off valve. The contents of the metering device 405 is open to the sample manager 410 and thereby a depressurization of the metering device 405 is managed by the sample manager 410.

The metering device 405 fully depresses (as shown in FIG. 4A) and the metering device 405 can be cleaned with rinse solvents managed by the sample manager 410.

Figure 5A:
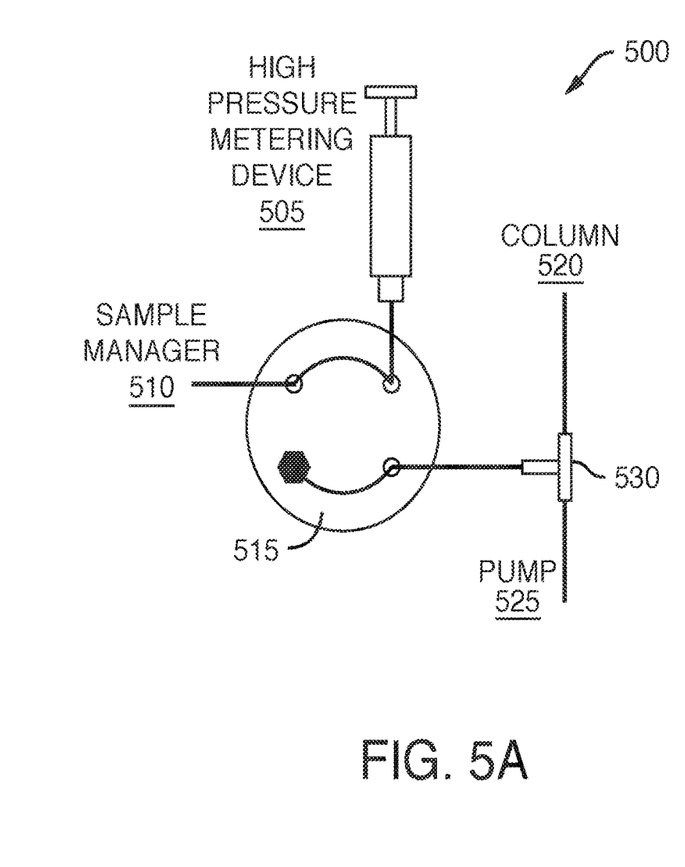
FIG. 5A is a schematic diagram showing another one-valve system for liquid sample introduction into a chromatography system with the valve in a first position, according to an illustrative embodiment of the technology.

The technology can provide another system that works with a single valve. FIGS. 5A-5D show a one-valve system 500 for introducing a liquid sample into a chromatography system. Referring to FIG. 5A, the system 500 includes a metering device 505, for example a high pressure metering device, for drawing up a liquid sample, for example, from a sample manager 510. A multi-port valve 515 is in fluid communication with the metering device 505 and the liquid sample.

Figure 5B:
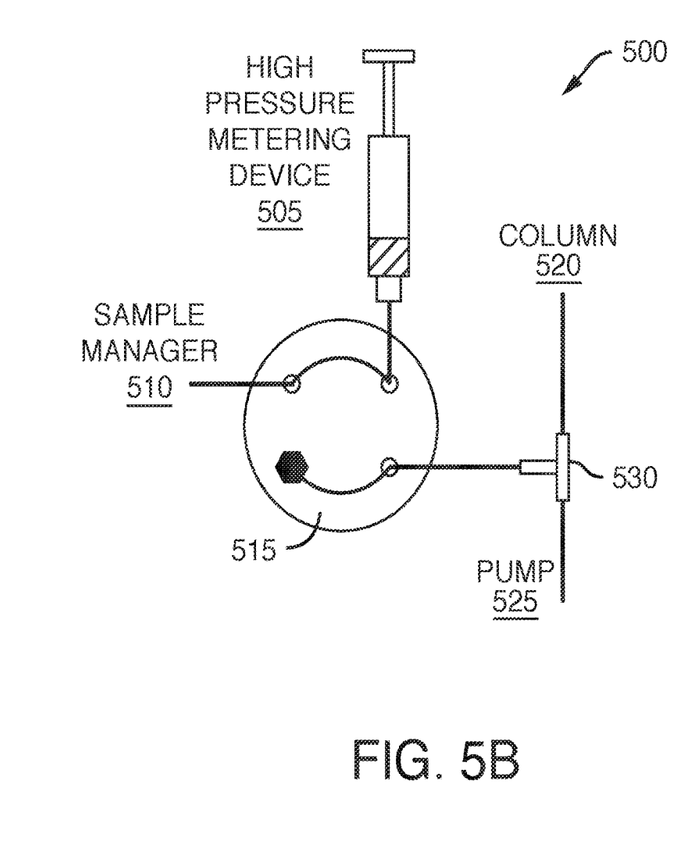
FIG. 5B is a schematic diagram showing the other one-valve system for liquid sample introduction into a chromatography system with the valve in a first position, according to an illustrative embodiment of the technology.
Figure 5C:
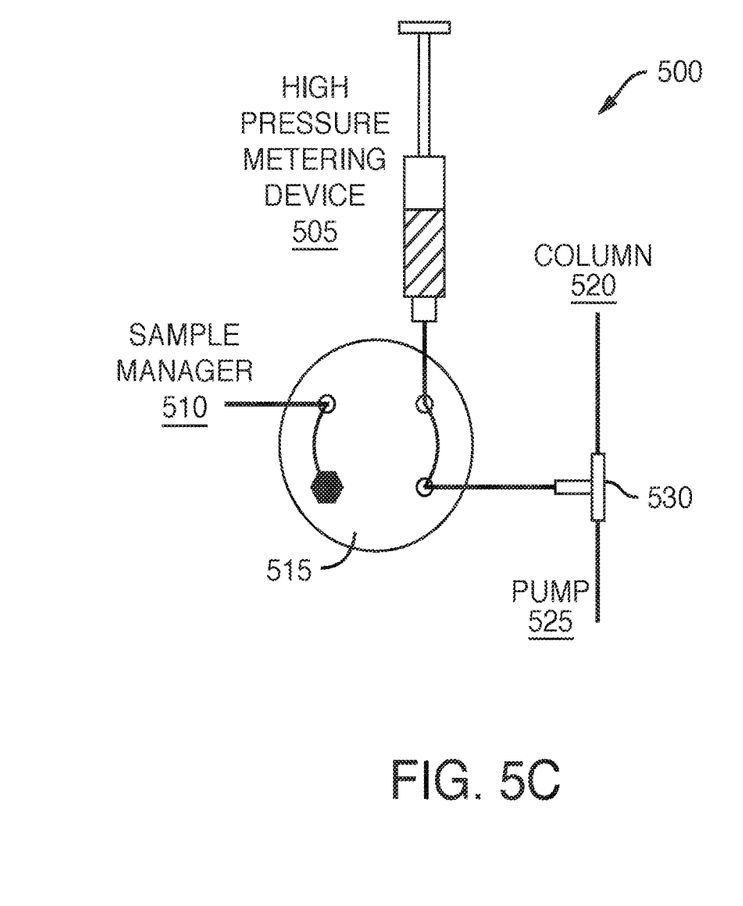
FIG. 5C is a schematic diagram showing the other one-valve system for liquid sample introduction into a chromatography system with the valve in a second position, according to an illustrative embodiment of the technology.
Figure 5D:
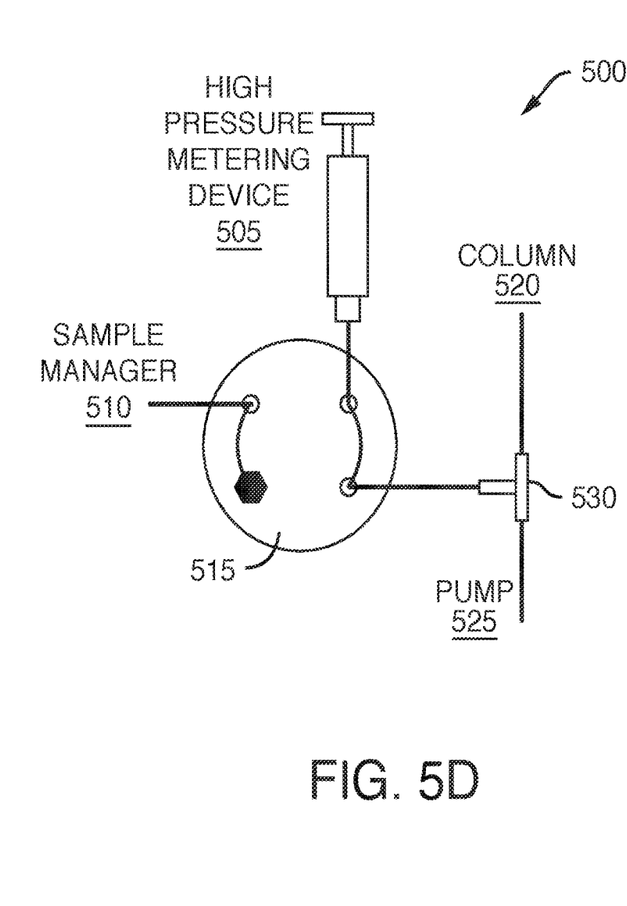
FIG. 5D is a schematic diagram showing the other one-valve system for liquid sample introduction into a chromatography system with the valve in a second position, according to an illustrative embodiment of the technology.

Referring to FIG. 5B, when the valve 515 is in a first position, the metering device 505 draws up the liquid sample filling a portion of the metering device 505. Referring to FIG. 5C, when the valve 515 is in a second position, the remaining portion of the metering device 505 is filled with a mobile phase thereby mixing with and pressurizing the liquid sample. Referring to FIG. 5D, the mixed and pressurizing sample flow to the chromatography column 520.

The valve 515 can have six, eight, or ten ports. In some embodiments, the valve has less than six ports, for example four ports, or more than ten ports, for example twelve ports. The valve 515 can be a rotary valves or a solenoid valve.

The mobile phase can be a highly compressible solvent, for example, carbon dioxide. The chromatography system can be a supercritical chromatography system.

A one-valve method for introducing a liquid sample into a chromatography system, for example the system of FIGS. 5A-5D, is also provided. Referring to FIG. 5A, the system 500 is in an initial condition prior to an injection sequence. Mobile phase travels from the pump 525 to the column 520 through a fluidic tee 530, which is also connected to the valve 515.

Referring to FIG. 5B, the liquid sample is aspirated into a metering device 505 through a multi-port valve 515. The sample fills a portion of the metering device 505. The volume of the sample pulled into the metering device 505 is some portion less than the total volume of the metering device 505. Mobile phase continues to travel from the pump 525 to the column 520 through a fluidic tee 530, which is also connected to the valve 515.

Referring to FIG. 5C, the valve 515 is adjusted such that a first portion of the mobile phase flows into the chromatography column 520 and a second portion of the mobile phase is aspirated into the metering device, thereby mixing and pressurizing the liquid sample and the mobile phase.

Referring to FIG. 5D, the mixed mobile phase and the liquid sample are dispensed into the chromatography column 520 through the valve 515. In some embodiments, this is done by depressing the plunger of the metering device 505, for example, when the metering device 505 is a syringe. The device then returns to its initial condition (FIG. 5A) and the metering device 505 can be cleaned with rinse solvents managed by the sample manager 510.

One of ordinary skill in the art will appreciate further features and advantages of the invention based on the above-described embodiments. Accordingly, the invention is not to be limited by what has been particularly shown and described, except, as indicated by the appended claims. All publications and references cited herein are expressly incorporated herein by reference in their entirety.

REFERENCES

FIG. 2: L. Miller, I Sebastian, J. Chromatogr. A 1250 (2012) 256-263.

What is claimed is:

1. A system for liquid sample introduction into a chromatography system, the system comprising:
   a metering device for drawing up the liquid sample;
   a first multi-port valve in fluid communication with a first end of the metering device and the liquid sample;
   a second multi-port valve in fluid communication with a second end of the metering device and a chromatography column; and
   a pump in fluid communication with the second multi-port valve and a mobile phase; and
   wherein (1) when the valves are in a first position the metering device draws up the liquid sample filling a portion of the metering device; (2) when the valves are in a second position, a remaining portion of the metering device is filled with the mobile phase thereby mixing with and pressurizing the liquid sample; and (3) when the valves are in a third position, the mixed and pressurized sample flows to the chromatography column.

2. The system of claim 1, further comprising a tee in fluid communication with the first multi-port valve, the second multi-port valve, and the column.

3. The system of claim 1, wherein the first multi-port valve and the second multi-port valve are rotary valves, solenoid valves, or pneumatic valves.

4. The system of claim 1, wherein the first multi-port valve and the second multi-port valve each have four ports, six ports, eight ports, or ten ports.

5. The system of claim 1, wherein the first multi-port valve has a different number of ports than the second multi-port valve.

6. The system of claim 1, wherein the mobile phase is a highly-compressible solvent.

7. The system of claim 6, wherein the highly-compressible solvent is carbon dioxide.

8. The system of claim 1, wherein the chromatography system is a supercritical fluid chromatography system.

9. A method for introducing liquid sample into a chromatography system, the method comprising:
   aspirating the liquid sample into a first end of a metering device through a first multi-port valve, wherein the liquid sample fills a portion of the metering device;
   flowing a mobile phase through a second multi-port valve into a chromatography column;
   flowing a first portion of the mobile phase into the chromatography column and a second portion of the mobile phase into the first end of the metering device by adjusting the first valve, thereby mixing and pressurizing the liquid sample and the mobile phase; and flowing the mobile phase through the second valve and into a second end of the metering device and flowing the mixed mobile phase and the liquid sample into the chromatography column through the first valve by adjusting the second valve.

10. The method of claim 9, wherein the aspirating and flowing a mobile phase through a second multi-port valve steps are performed simultaneously.

11. The method of claim 9, wherein the mobile phase is a highly-compressible solvent.

12. The method of claim 11, wherein the highly-compressible solvent is carbon dioxide.

* * * * *